Patented Dec. 26, 1944

2,365,809

UNITED STATES PATENT OFFICE 2,365,809

MORDANT DYEING OF CELLULOSE DERIVATIVES

George Holland Ellis and Alexander James Wesson, Spondon, near Derby, England, assignors to Celanese Corporation of America, a corporation of Delaware No Drawing. Application May 21, 1941, Serial No. 394,478. In Great Britain June 29, 1940

8 Claims. (Cl. 8—30)

The present invention is concerned with the colouring of fibrous textile material, foils, films and the like of cellulose acetate or other cellulose ester or ether. It is more particularly concerned with the colouring of these materials with the aid of mordant dyes, especially water-soluble mordant dyes such as are commonly applied to wool in conjunction with a chrome mordant for the production thereon of shades of good general fastness properties, and especially good fastness to aqueous treatments. The invention affords a method whereby cellulose acetate fibres can be coloured with these mordant dyes with the production of shades having fastness properties similar to those obtainable with the same dyes on wool. Fibres thus coloured are very suitable for use in admixture with coloured or uncoloured wool or other animal fibres.

It has been found that a mordant dye and a salt of a mordant metal can be readily incorporated in fibrous textile material, foils, films or the like of cellulose acetate or other cellulose ester or ether by applying to the latter material an organic liquid containing the mordant dye and a salt of a mordant metal. By this new method the mordant dye and the mordant metal salt can be very intimately incorporated with the cellulose ester or ether of the fibrous textile material, foils, films or the like, so that when formation of the lake of the dye with the mordant metal takes place shades can be obtained of the excellent fastness properties, especially to milling and other aqueous treatments, usually associated with mordant dyeings on, for example, wool.

In general some further treatment is required to effect the formation of the dye lake on the material from the mordant dye and mordant metal salt. Steaming of the material is very effective for this latter purpose. By using a volatile organic liquid, for example an aqueous alcohol of about 70–80% strength, the whole process of colouring the cellulose ester or ether material becomes one of great simplicity. It resolves itself into impregnating the material with such quantity of the liquid containing the mordant dye and mordant metal salt as is necessary to yield the desired shade, drying the material to remove the alcohol or other volatile organic liquid employed and steaming to effect formation of the lake of the mordant dye.

For the incorporation of the mordant dye and the salt of a mordant metal in the material various organic liquids can be employed, that is liquids of which a substantial proportion, e. g. 25% or more, is organic. Preferably 50% or more of the liquid is organic. On the other hand the presence of some water in the liquid, e. g. 15–45% and especially 25–40%, is an advantage and it is desirable therefore that the organic constituents of the liquid should be miscible with water in the proportions indicated.

The organic liquid employed is preferably a swelling agent for the cellulose ester or ether to be treated under the conditions of application. Moreover, as indicated above, the organic constituent or constituents of the liquid should be volatile, preferably having boiling points below 150° C. Organic constituents having boiling points below 100° C. are particularly useful. As the organic constituents of the liquids, alcohols are especially suitable, for example methyl, ethyl and propyl alcohol (normal or iso). Again, water-miscible ketones may be employed, for example acetone, methyl ethyl ketone and diacetone alcohol. Further, esters can be used, for example methyl acetate, ethyl acetate and ethyl lactate. As regards the use of esters as the organic constituent of the liquid, organic liquids consisting of mixtures of volatile carboxylic esters with volatile alcohols with or without water are very useful. For example, mixtures of ethyl acetate, ethyl alcohol and water can be used in the proportions, for instance, of 40 parts of ethyl acetate, 60 parts of alcohol and 70 parts of water. In general, when using ethyl acetate and ethyl or methyl alcohol in conjunction, the ratio of the alcohol to the ethyl acetate in the mixture is with advantage from 3:1 to 7:1.

The presence of acid in the dye liquid is sometimes an advantage from the point of view of preserving the stability of the dye liquid and preventing lake formation prior to the incorporation of the liquid in the cellulose ester. Formic, acetic, and other volatile organic carboxylic acids are suitable for this purpose.

The mordant metal salts utilised in accordance with the invention can be, for example those of chromium, aluminum, iron or other metals commonly employed as mordant metals. They can be salts of either organic or inorganic acids. For example they may be chlorides, fluorides or thiocyanates. Again, they can be salts of organic carboxylic acids, and particularly good results can be obtained by employing the mordant metal in the form of a salt with a volatile organic acid, for example formic acid or acetic acid, or other organic carboxylic acid having a boiling point below about 150° C. The "acetate of chrome" commonly used in connection with the application of mordant dyes to wool is particularly suitable for the purposes of the present invention.

The mordant dyes applied in accordance with the invention can be of any desired series, for example they may be of the azo, anthraquinone, oxazine or triaryl methane series. It is preferred to employ dyes which are salts of sulphonic or carboxylic acids and are soluble in water. Good results can be obtained with the following dyes:

Alizarine Yellow GD (Sandoz), (Schulze Farbstoff Tabellen, 7th ed., supplementary vol. I, page 63)
Cromosol Yellow GD (Sandoz), (Schulze Farbstoff Tabellen, 7th ed., vol. II, page 58)
Metachrome Bordeau BL (IG), (Schulze Farbstoff Tabellen, 7th ed., supplementary, vol. I, supplementary, vol. I, page 111)
Solochrome Brown RHS (Schulze No. 134)
Anthracene Blue G (ICI), (Color Index No. 1059)

All of these yield, when applied to cellulose acetate by the new process in conjunction with chromium acetate, valuable shades of very good fastness properties, and particularly to wet processing. The materials so dyed can be subjected to soaping in contact with undyed cellulose acetate or wool fibres without substantial bleeding of colour from the coloured to the uncoloured material taking place.

The solutions of the mordant dyes and mordant metal salts in the organic liquids are very conveniently prepared by dissolving the dye and salt separately in water and adding the solutions to the organic constituent of the dye liquid.

The application of the dye liquid to the material is most conveniently effected by mechanical impregnation, that is by methods in which the material is impregnated with a quantity of liquid containing an amount of dye and mordant metal salt capable of yielding the desired shade upon lake formation. In the case of textile fabrics, for instance, application by means of the padding mangle is very convenient. Again, hanks or bobbins of yarn, or staple fibre, whether loose or in sliver or other form, can be impregnated by immersing them in a bath of the liquid containing the dye and mordant metal salt and thereafter freeing them from liquid in excess of that it is desired to retain by, for example, squeezing, suction, centrifuging or the like. From the points of view of ease of manipulation and of uniformity of the resulting dyeings it is advantageous that the quantity of liquid on the impregnated material is from 50 to 200 per cent of the weight of the material itself. It is generally convenient to arrange the concentration of dye and mordant metal salt in the liquid, so that the desired shade is obtained when the material retains from 100 to 200% of its weight of the liquid.

The application of the liquid to the material is conveniently effected at ordinary temperatures, for example at temperatures between 10 and 40° C.

As mentioned above, the material impregnated with the dye and mordant metal salt is advantageously steamed to effect lake formation on the material. Other methods of causing lake formation to take place may, however, be used, for example treatment with other aqueous media, e. g. hot water or with a hot weakly alkaline aqueous liquid.

As already indicated the invention can be applied to cellulose acetate materials. It can also be applied to materials of cellulose esters or other organic acids, e. g. cellulose formate, propionate, or butyrate, or again, it may be applied to fibrous textile materials, foils, films or the like of methyl cellulose, ethyl cellulose, benzyl cellulose or other ether of cellulose. Moreover, it can be applied to materials consisting in part of cellulose ester or ether fibres and in part of other textile fibres, for example cellulose fibres, e. g. cotton and fibres of regenerated cellulose, or animal fibres e. g. wool and silk. The term "fibre" is used to include both short fibres, e. g. staple fibre, and continuous fibres or filaments.

When it is desired to produce solid shades on a material consisting of both cellulose acetate fibres (or other cellulose ester or ether fibres) and animal fibres, e. g. wool or natural silk, it is advantageous to include an acid, e. g. acetic acid in the liquid containing the mordant metal salt and the mordant dye. For instance 0.5 to 5 per cent of acetic or other volatile organic carboxylic acid can be included in the dye liquid. Such mixed material can be in the form of a mass of loose fibres or in the form of textile yarn or fabric.

The invention is illustrated by the following example:

*Example*

30 grams of Anthracene Blue G (Color Index No. 1059) powder are dissolved in 600 ccs. of water and poured into 2800 ccs. of methylated spirits. 200 grams of "acetate of chrome" are separately dissolved in 600 ccs. of water and the solution added to the above mixture. Cellulose acetate staple fibre is immersed for 15 minutes in this solution at a temperature of 30–35° C. The staple fibre is then removed from the liquid, drained and centrifuged so that it retains about 150% of its weight of the dye liquid. It is then dried at a temperature below 40° C. until the methylated spirit has evaporated and drying is then finished at about 70° C. The fibre is then steamed for half an hour at a pressure of 5 lbs. per square inch and finally soaped at 70° C. for 10 minutes in a solution containing 2½ grams per litre of soap. The material is then rinsed and dried. The material is thus dyed a blue shade of excellent fastness to milling.

Other mordant dyes and mixtures of mordant dyes e. g. those specified above, can be applied similarly. If the process of the above example is modified by including a small proportion of acetic acid in the dye liquid it is suitable for colouring in a solid shade textile material consisting of both cellulose acetate fibres and wool fibres. The terms "mordant metal salt" or "salt of a mordant metal" are used in the specification and claims in their ordinary sense of a salt in which the basic radicle is a mordant metal.

Having described our invention, what we desire to secure by Letters Patent is:

1. A process for the colouration of cellulose ester or ether fibrous textile materials, foils, films, and the like by forming therein a lake of a mordant dye from the dye and a salt of a mordant metal, wherein the dye and mordant metal salt are incorporated in the material by impregnating the latter with a solution of the dye and the mordant metal salt in a liquid medium which is a swelling agent for the material and contains at least 25% of a volatile organic liquid.

2. Process for the colouration of cellulose ester or ether fibrous textile materials, foils, films and the like, which comprises impregnating the material with a solution of a mordant dye and a mordant metal salt in a liquid medium which is a swelling agent for the material and contains at least 25% of a volatile organic liquid, removing the volatile organic liquid from the material by evaporation, and steaming the material to effect formation of a lake of the dye with the mordant metal.

3. Process for the colouration of cellulose acetate fibrous textile material which comprises impregnating it with a solution of a mordant dye and chromium acetate in ethyl alcohol containing 15 to 45 per cent of water, removing the alcohol from the material by evaporation, and then steaming the material to effect formation of a chromium lake of the dye on the material.

4. Process for the coloration of cellulose ester or ether fibrous textile materials, foils, films and the like, which comprises impregnating the material with a solution of a mordant dye and a mordant metal salt in a liquid medium containing 15-45% of water and at least 50% of an organic liquid boiling below 100° C. miscible with water in the proportion employed, said medium being a swelling agent for the material, removing the organic liquid from the material by evaporation, and steaming the material to effect formation of a lake of the dye with the mordant metal.

5. Process for the coloration of cellulose acetate fibrous textile materials, which comprises impregnating the material with a solution of a mordant dye and a mordant metal salt in a liquid medium which is a swelling agent for the material and contains at least 25% of a volatile organic liquid, removing the volatile organic liquid from the material by evaporation, and steaming the material to effect formation of a lake of the dye with the mordant metal.

6. Process for the coloration of cellulose acetate fibrous textile materials, which comprises impregnating the material with a solution of a mordant dye and a mordant metal salt in a liquid medium containing 15-45% of water and at least 50% of an organic liquid boiling below 100 C. miscible with water in the proportion employed, said medium being a swelling agent for the material, removing the organic liquid from the material by evaporation, and steaming the material to effect formation of a lake of the dye with the mordant metal.

7. Process for the coloration of cellulose acetate staple fiber, which comprises impregnating the material with a solution of a mordant dye and a mordant metal salt in a liquid medium containing 15-45% of water and at least 50% of an organic liquid boiling below 100° C. miscible with water in the proportion employed, said medium being a swelling agent for the material, removing the organic liquid from the material by evaporation, and steaming the material to effect formation of a lake of the dye with the mordant metal.

8. Process for the coloration of both the animal fibers and the cellulose ester or ether fibers of a textile material containing both these fibers, which comprises impregnating the material with a solution of a mordant dye and a mordant metal salt in a liquid medium containing an acid, 15-45% of water, and at least 50% of an organic liquid boiling below 100° C. miscible with water in the proportion employed, said medium being a swelling agent for the material, removing the organic liquid from the material by evaporation, and steaming the material to effect formation of a lake of the dye with the mordant metal.

GEORGE HOLLAND ELLIS.
ALEXANDER JAMES WESSON.